(12) United States Patent
Jeon

(10) Patent No.: US 8,312,821 B2
(45) Date of Patent: Nov. 20, 2012

(54) WASTE-TIRE RECYCLING SYSTEM

(75) Inventor: Yeong Min Jeon, Busan (KR)

(73) Assignee: Advanced Controls & Engineerings, Corp. (KR)

( * ) Notice: Subject to any disclaimer, the term of this patent is extended or adjusted under 35 U.S.C. 154(b) by 1014 days.

(21) Appl. No.: 12/304,254

(22) PCT Filed: Nov. 2, 2006

(86) PCT No.: PCT/KR2006/004547
§ 371 (c)(1),
(2), (4) Date: Dec. 10, 2008

(87) PCT Pub. No.: WO2007/145400
PCT Pub. Date: Dec. 21, 2007

(65) Prior Publication Data
US 2009/0200150 A1 Aug. 13, 2009

(30) Foreign Application Priority Data
Jun. 16, 2006 (KR) ........................ 10-2006-0054431

(51) Int. Cl.
*C10B 49/00* (2006.01)
*F23G 5/027* (2006.01)
(52) U.S. Cl. ............ 110/233; 110/235; 202/99; 202/226
(58) Field of Classification Search ............... 202/99, 202/108, 121, 124, 226; 110/233, 234, 235, 110/259; 201/3, 7, 16, 25, 27, 29, 37, 43
See application file for complete search history.

(56) References Cited
U.S. PATENT DOCUMENTS

| | | | | |
|---|---|---|---|---|
| 1,414,223 A * | 4/1922 | Smith | ............................... | 201/7 |
| 4,038,152 A * | 7/1977 | Atkins | ........................... | 201/2.5 |
| 4,203,804 A * | 5/1980 | Janning et al. | ................. | 202/121 |
| 5,290,327 A * | 3/1994 | Rossle | ............................ | 48/111 |
| 5,435,890 A | 7/1995 | Munger | | |
| 6,170,411 B1 * | 1/2001 | An | ................................ | 110/233 |
| 6,657,095 B1 | 12/2003 | Holden et al. | | |

FOREIGN PATENT DOCUMENTS

| | | |
|---|---|---|
| JP | 09-286990 | 11/1997 |
| JP | 11-244824 | 9/1999 |
| JP | 2004-067844 | 3/2004 |

\* cited by examiner

*Primary Examiner* — Jill Warden
*Assistant Examiner* — Joye L Woodard
(74) *Attorney, Agent, or Firm* — Park & Associates IP Law, P.C.

(57) ABSTRACT

Disclosed is a system for recycling waste tires, which are industrial wastes, so as to protect our environment against pollution and promote recycling of industrial material. The waste-tire recycling system includes a pyrolyzing unit for pyrolyzing a waste tire by using a pyrolysis reactor, in which a CO or N gas circulates as a carrier gas, a decomposed residue processing unit for crushing a decomposed residue pyrolyzed by the pyrolysis reactor to separate the decomposed residue into carbon and an iron core, an oil collecting unit for cooling and condensing an exhaust gas discharged from the pyrolysis reactor to recover heavy oil from the gas, a carbon processing unit for supplying a heat source to the circulating carrier gas by using a hot exhaust gas generated when the carbon separated from the decomposed residue is burned up, and operating a steam turbine and an absorption refrigerator to generate electricity and cold water, an exhaust gas processing unit for clarifying the exhaust gas discharged from the carbon processing unit to discharge the clarified gas in an atmosphere, and recovering a part of the CO or N gas from the exhaust gas.

6 Claims, 6 Drawing Sheets

WASTE-TIRE RECYCLING SYSTEM

TECHNICAL FIELD

The present invention relates to a system for recycling waste tires which are industrial wastes, so as to protect our environment against pollution and promote recycling of industrial material, and more particularly, to a waste-tire recycling system using carbon dioxide or nitrogen gas as a carrier gas to prevent the system from exploding due to a direct heating manner when waste tires are recycled, by which oil, scrap iron, electricity, cold water, carbon dioxide, and nitrogen can be obtained from a decomposed residue and an exhaust gas.

BACKGROUND ART

Rapid increase of automobiles results in increased demand of tires. As a result, the number of tires wasted due to its completed lifespan or damage in use is increased.

Further, the waste tires are increased in proportion to the number of automobiles. Hence, the waste tires cause serious environmental pollution. However, most of the waste tires are not recycled, but come into disuse.

The disposal of the waste tires is generally carried out by two methods, i.e., landfill and incineration. The landfill of the waste tires requires a wide area of landfill site, and also causes pollution of soil and underground water. Further, the incineration of the waste tires causes serious air pollution due to incomplete combustion.

In order to recycle or reuse the waste tires, several plans have been devised and proposed. Diverse recycled products such as pavement block or artificial fishing reef have been proposed and used at present, but are still insignificant.

A pyrolysis reactor should be used to pyrolyze or thermally decompose the waste tires to recycle them. The pyrolysis reactor is classified into two types, i.e., a direct heating type and an indirect heating type.

DISCLOSURE OF INVENTION

Technical Problem

The direct heating type of pyrolysis reactor is in danger of explosion since the hot oil vapor exhausted from the pyrolyzing waste tires in pyrolysis reactor is chemically reacted with the excessive oxygen contained in the combustion gas to be supplied from an oil burner to heat the waste tires. Also, there is another problem that since the oil extracted from the direct heating type of pyrolysis reactor contains much moisture, the oil is inferior in quality.

The indirect heating type of pyrolysis reactor has no danger of explosion. However, because of its low thermal efficiency, most of oil obtained from it as a by-product should be used as a fuel. Therefore, the waste-tire recycling system is not economical. Further, there is another problem in that it is difficult to dispose of carbon obtained from both types of pyrolysis reactors as a by-product.

Therefore, the present invention has been made to solve the above-mentioned problems occurring in the prior art, and an object of the present invention is to provide a waste-tire recycling system using carbon dioxide ($CO_2$) or nitrogen ($N_2$) as a carrier gas to prevent the system from exploding when waste tires are thermally decomposed by a direct heating manner.

Another object of the present invention is to provide a waste-tire recycling system capable of obtaining oil, scrap iron, electricity, cold water, carbon dioxide, and nitrogen from a decomposed residue and an exhaust gas.

Still another object of the present invention is to provide a waste-tire recycling system capable of recovering and using waste heat, which is resulted from incineration of waste carbon obtained from a decomposed residue, as a heat source to pyrolyze the waste tires and obtain electricity, cold water, carbon dioxide, or nitrogen.

Technical Solution

In order to accomplish the above-mentioned objects, there is provided a waste-tire recycling system comprising: pyrolyzing means for pyrolyzing a waste tire by using a pyrolysis reactor, in which a $CO_2$ or $N_2$ gas circulates as a carrier gas; decomposed residue processing means for crushing a decomposed residue pyrolyzied by the pyrolysis reactor to separate the decomposed residue into carbon and an iron core; oil collecting means for cooling and condensing an exhaust gas discharged from the pyrolysis reactor to recover heavy oil from the gas; carbon processing means for supplying a heat source to the circulating carrier gas by using a hot exhaust gas generated when the carbon separated from the decomposed residue is burned up, and operating a steam turbine and an absorption refrigerator to generate electricity and cold water; exhaust gas processing means for clarifying the exhaust gas discharged from the carbon processing means to discharge the clarified gas in an atmosphere, and recovering a part of the $CO_2$ or $N_2$ gas from the exhaust gas.

The pyrolysis reactor used in the pyrolyzing means may include an inlet port formed on a portion of an upper portion for inputting the waste tire, a discharge port formed on a portion of the upper portion for circulating hot steam produced by pyrolysis, an outlet port formed on a lower portion thereof for discharging the decomposed residue, and a pair of rollers provided on a bottom thereof and meshed with each other and rotated to primarily crush the decomposed residue.

The decomposed residue processing means may include a crusher for secondarily crushes the residue primarily crushed by the pyrolysis reactor; a chain conveyor for separating the residue crushed by the crusher into carbon and an iron core; and a carbon storage and an iron core storage each for storing the carbon and the iron core separated by the chain conveyor.

The oil collecting means may include a condenser for cooling and condensing the hot vapor discharged from the pyrolysis reactor to primarily recover heavy oil from the vapor; an oil tank for storing the heavy oil cooled and condensed by the condenser; a cyclone for collecting a heavy oil component, which is cooled and condensed by the condenser and is dispersed into the carrier gas ($CO_2$ or $N_2$ gas) in a mist state, and transferring into the oil tank; and a third recovery tank for directly contacting the heavy oil with liquefied heavy oil in an aerated manner to collect the heavy oil, and transferring the oil to the oil tank.

The carbon processing means may include a carbon incinerator for burning up the carbon supplied by the carbon storage; a primary heat exchanger for heating a carrier gas, which is cooled when it passes through the oil collecting means from the pyrolysis reactor, by using a hot exhaust gas produced by the carbon incinerator; a secondary heat exchanger for converting the exhaust gas passing through the primary heat exchanger into a pressurized steam; a steam turbine and an absorption refrigerator driven by the pressurized steam generated by the secondary heat exchanger to generate electricity and cold water; and a high-pressure pump for circulating a condensed water discharged from the steam turbine and the absorption refrigerator into the secondary heat exchanger.

The exhaust gas processing means may include a purifying tower for eliminating SOx from the exhaust gas discharged from the secondary heat exchanger by using a diluted caustic soda solution to discharge the purified exhaust gas in an atmosphere; and a carrier gas separating unit receiving a part of the exhaust gas discharged from the purifying tower to separate a $CO_2$ or $N_2$ gas from the exhaust gas which is used as the carrier gas.

Advantageous Effects

With the construction, the waste-tire recycling system of the present invention can generate oil, carbon, scrap iron, $CO_2$ or $N_2$ electricity, and cold water by recycling the waste tires, thereby improving a recycling efficiency and preventing the environmental pollution.

Also, the waste tires are thermally decomposed through the direct heating type of pyrolysis reactor using the $CO_2$ or $N_2$ gas as the carrier gas, thereby preventing the pyrolysis reactor from exploding.

The recycling system of the present invention can generate the oil of high quality which contains no moisture, thereby obtaining a higher economical effect from the oil.

Further, the energy generated when the recycled carbon is burned is converted into the electricity and the cold water which are required to operate the system.

BRIEF DESCRIPTION OF THE DRAWINGS

The above objects, other features and advantages of the present invention will become more apparent by describing the preferred embodiments thereof with reference to the accompanying drawings, in which.

BEST MODE FOR CARRYING OUT THE INVENTION

Figure 1:
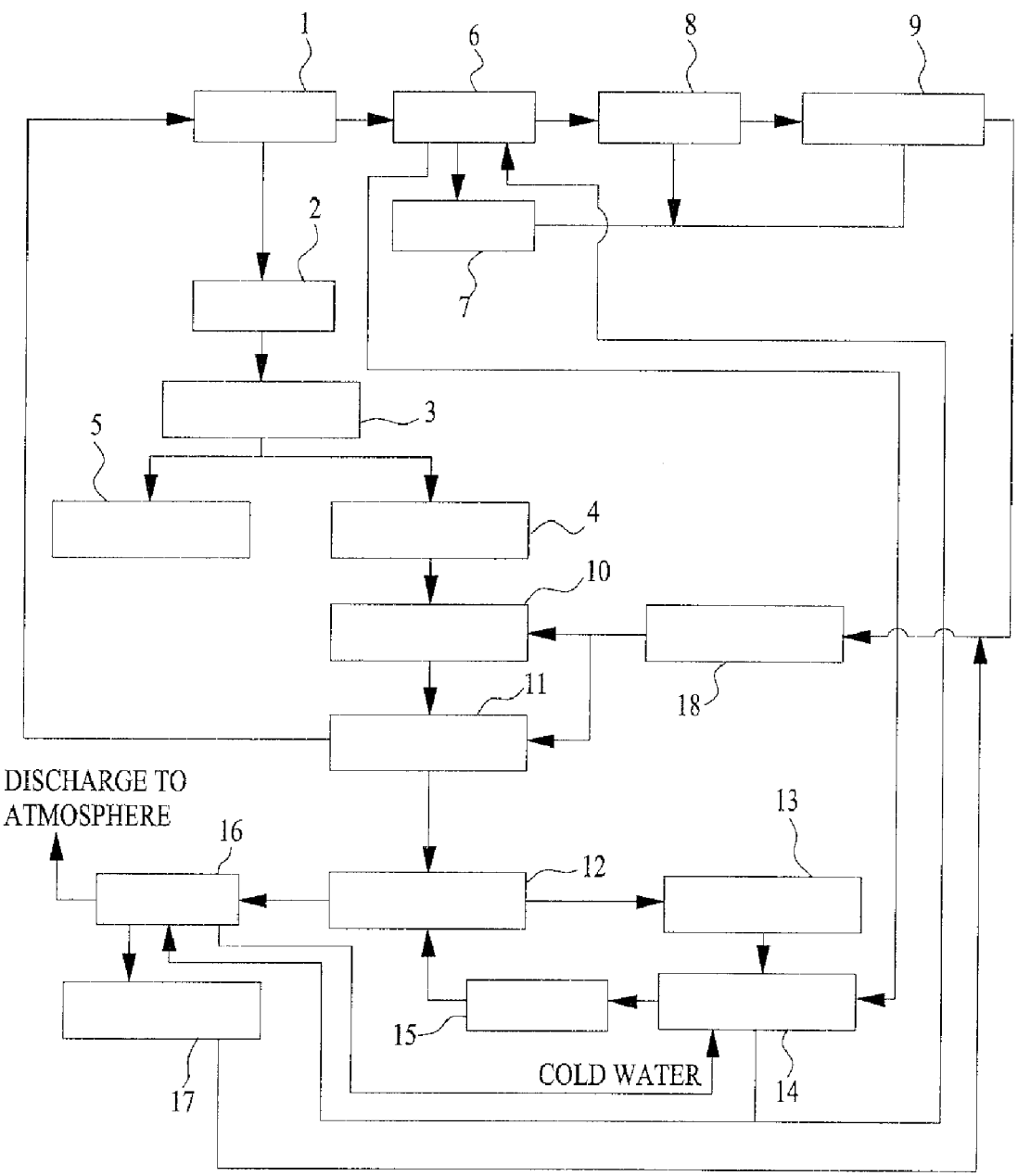
FIG. 1 is a schematic diagram depicting a waste-tire recycling system according to the present invention.

Now, a waste-tire recycling system according to a preferred embodiment of the present invention will be described in detail with reference to the accompanying drawings. In the following description of the present invention, the same drawing reference numerals are used for the same elements even in different drawings, and the duplicate explanation thereof will be omitted.

Figure 2:
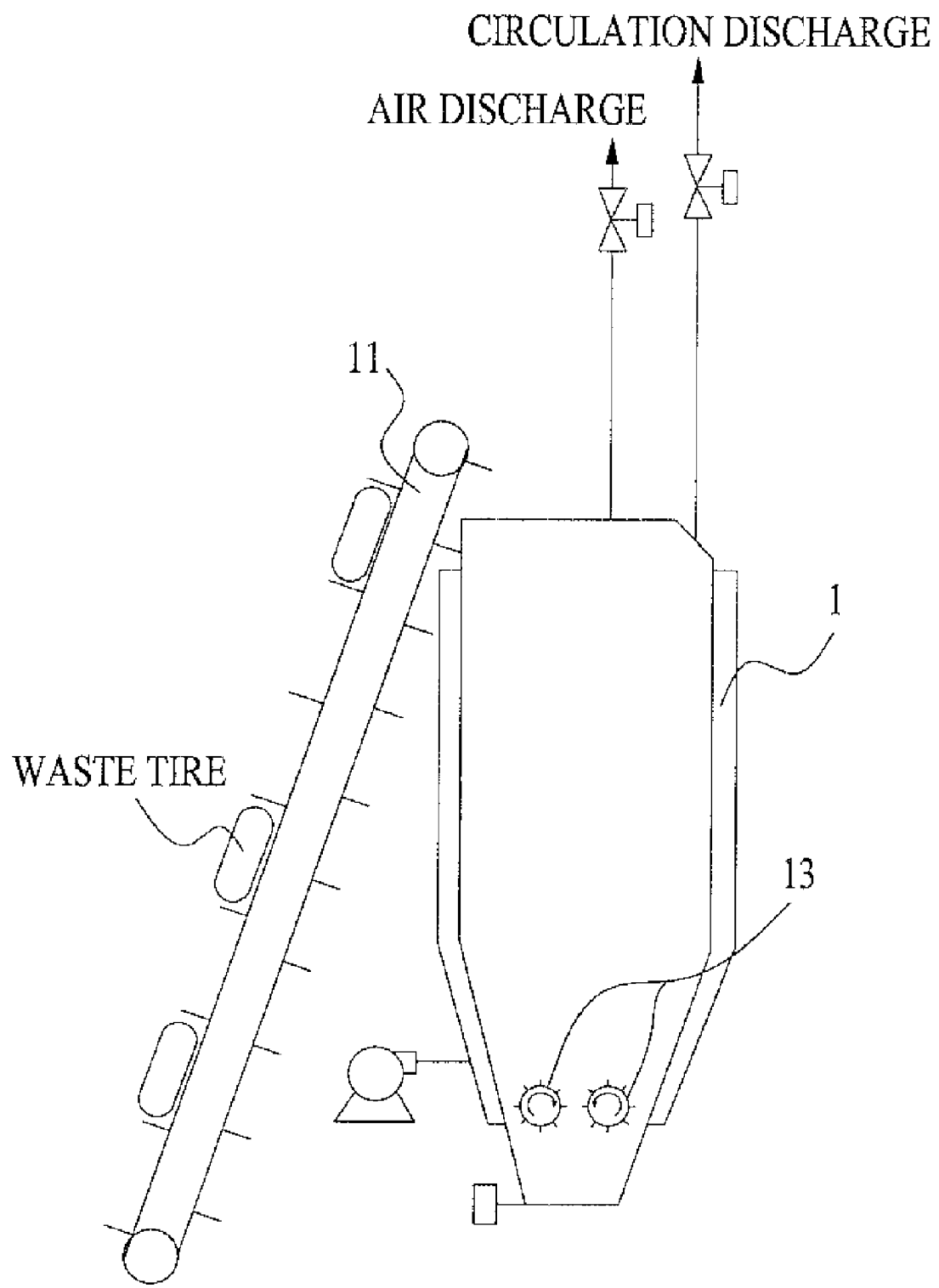
FIG. 2 is a schematic view depicting a pyrolyzing means according to the present invention.
Figure 3:
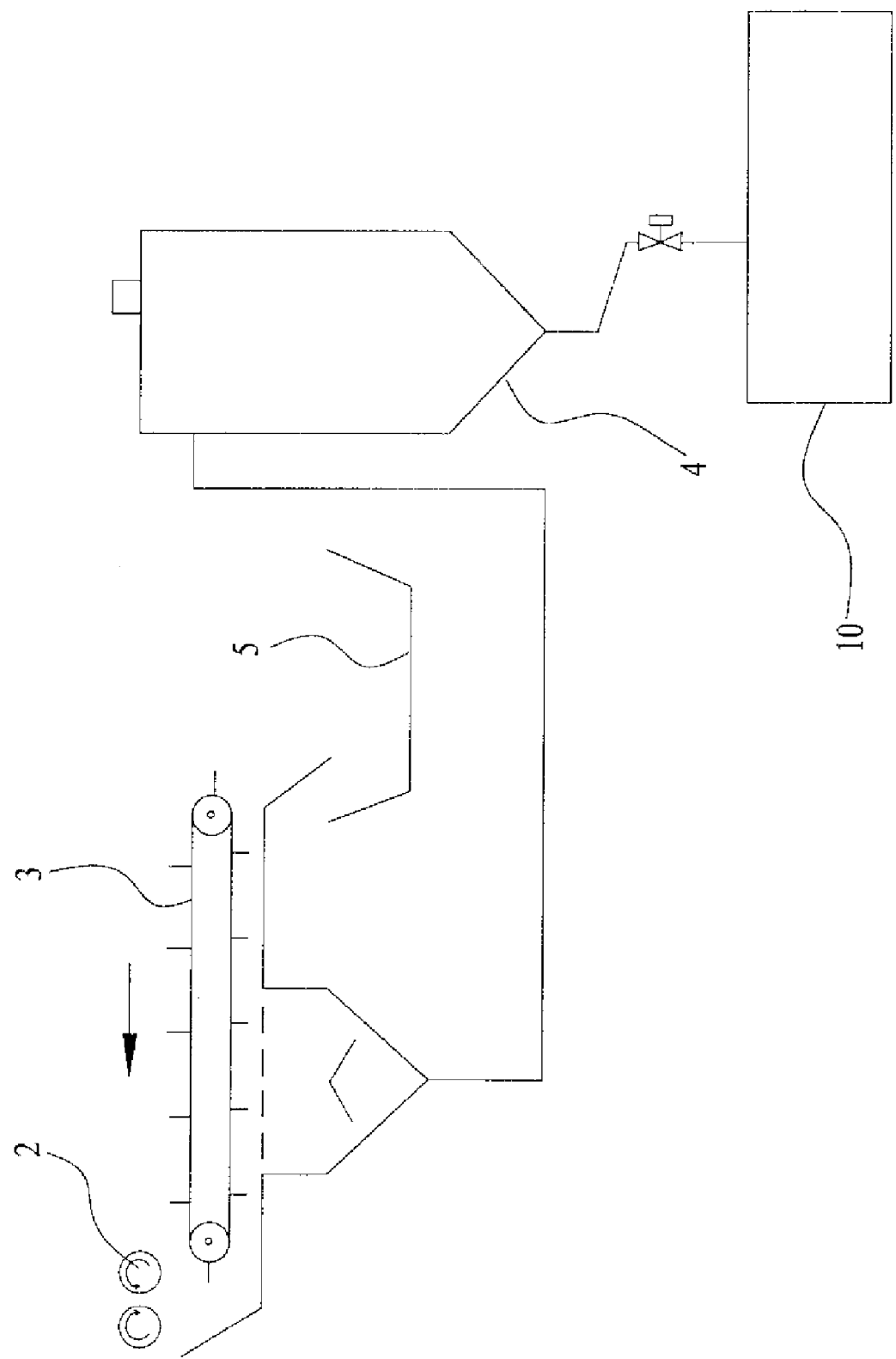
FIG. 3 is a schematic view depicting a decomposed residue processing means according to the present invention.
Figure 4:
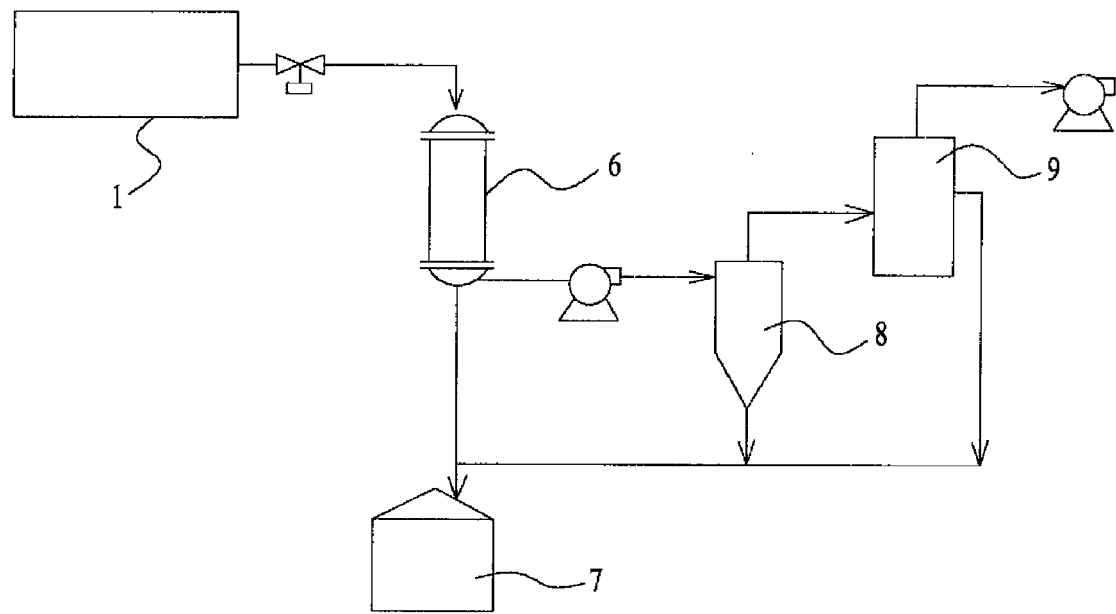
FIG. 4 is a schematic view depicting an oil collecting means according to the present invention.
Figure 5:
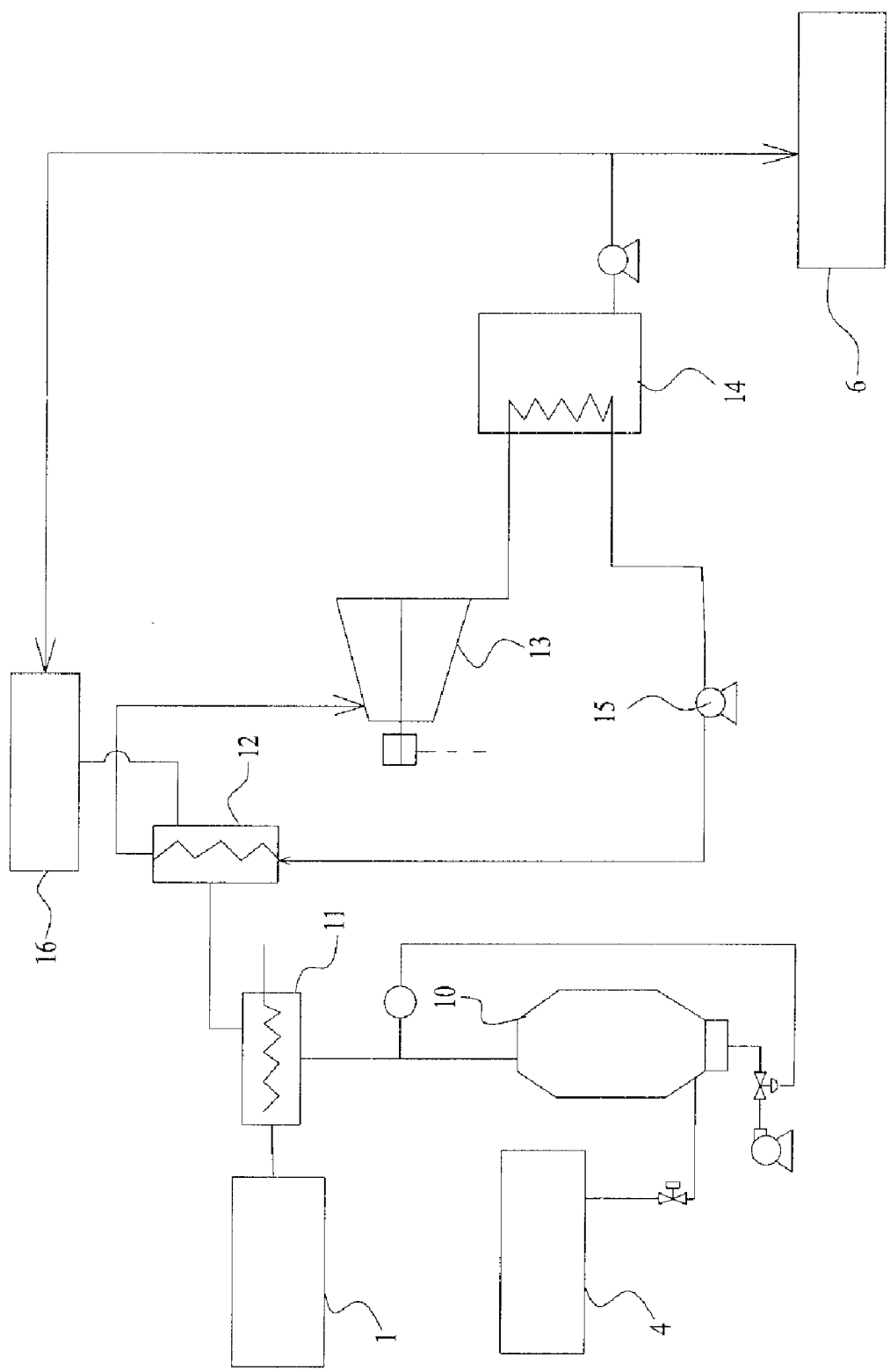
FIG. 5 is a schematic view depicting a carbon processing means according to the present invention.
Figure 6:
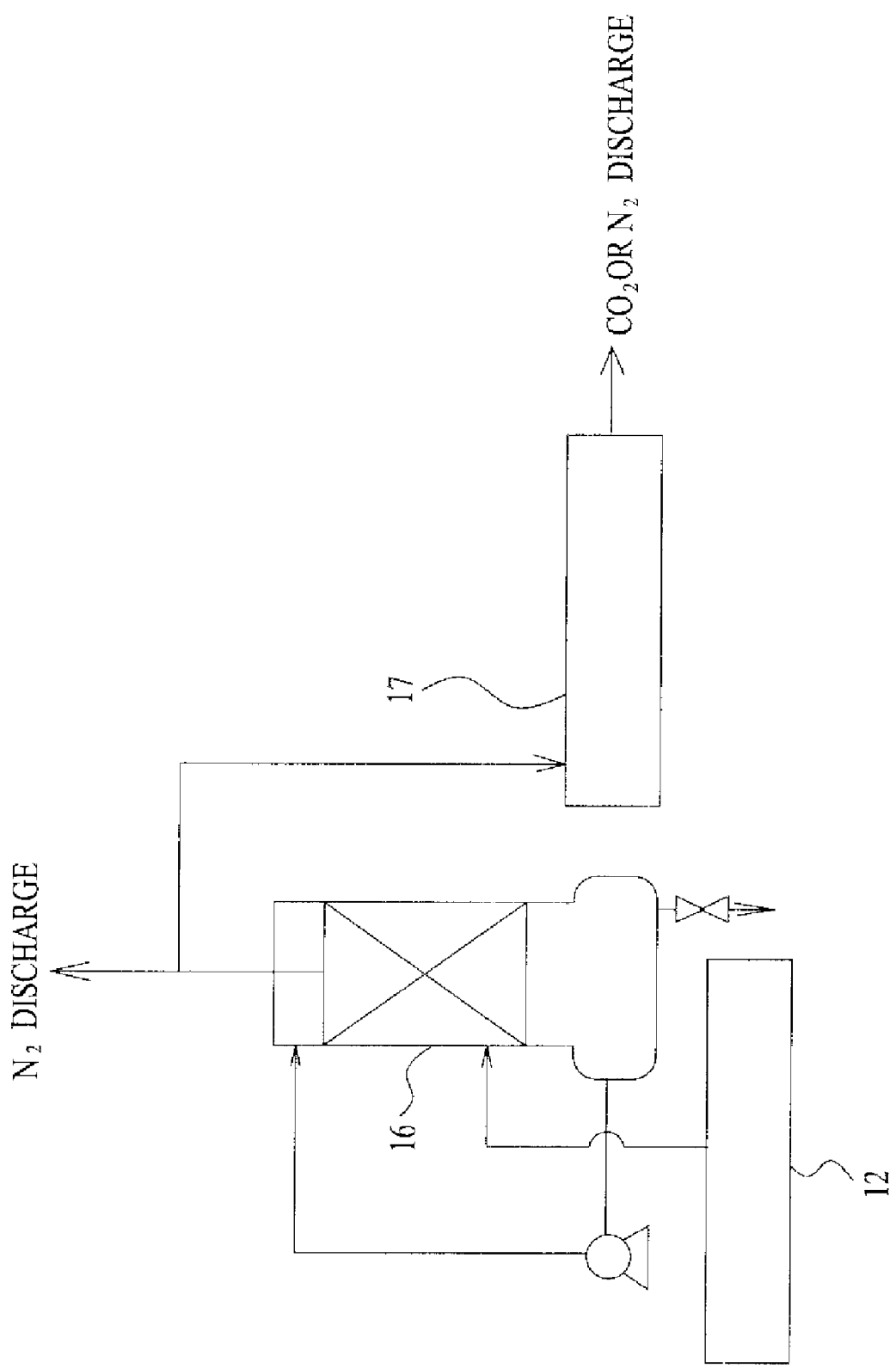
FIG. 6 is a schematic view depicting an exhaust gas processing means according to the present invention.

FIG. 1 is a schematic diagram depicting a waste-tire recycling system according to the present invention. FIG. 2 is a schematic view depicting a pyrolyzing means according to the present invention. FIG. 3 is a schematic view depicting a decomposed residue processing means according to the present invention. FIG. 4 is a schematic view depicting an oil collecting means according to the present invention. FIG. 5 is a schematic view depicting a carbon processing means according to the present invention. FIG. 6 is a schematic view depicting an exhaust gas processing means according to the present invention.

Referring to FIG. 1, the waste-tire recycling system according to the present invention includes a waste-tire pyrolyzing means, a decomposed residue processing means, an oil collecting means, a carbon processing means, and an exhaust gas processing means.

The waste-tire pyrolyzing means includes, as shown in FIG. 2, a pyrolysis reactor 1 for directly heating the waste tires by using a $CO_2$ or $N_2$ gas, which circulates in the reactor 1, as a carrier gas. The pyrolysis reactor 1 has an inlet port formed on a portion of an upper portion of the pyrolysis reactor 1 for inputting the waste tires, a discharge port formed on a portion of the upper portion for circulating hot vapor produced by the pyrolysis, an air discharge port formed on a portion of the upper portion for discharging air outwardly when the system starts to operate, and an outlet port formed on a lower portion of the pyrolysis reactor 1 for discharging a decomposed residue.

When the pyrolysis reactor 1 starts to operate, the carrier gas is injected into the pyrolysis reactor 1. The carrier gas pushes the air out of the pyrolysis reactor 1, and the pyrolysis reactor 1 is gradually filled with the carrier gas. As the pyrolysis reactor 1 is filled with the carrier gas from the lower portion thereof, the air is discharged through the air discharge port. When the air is completely discharged, the air discharge port is closed, and a circulation discharge portion is opened. Hence, after the carrier gas passes through the oil collecting unit and a blower 18, as shown in FIG. 4, the carrier gas obtains a heat source needed for the pyrolysis from a primary heat exchanger, and is again supplied to the pyrolysis reactor 1.

At that time, a small quantity of carrier gas continuously supplies to the front end of the blower 18, and a part of the carrier gas is discharged from the rear end of the blower 18, thereby preventing unknown material from being accumulated in the circulating carrier gas.

A transfer conveyor 11 is provided to a position adjacent to the inlet port to transfer the waste tires into the pyrolysis reactor 1, so that the waste tires are supplied to the pyrolysis reactor 1 by the transfer conveyor 11. The pyrolysis reactor 1 is provided on the bottom thereof with a pair of rollers 13 having a plurality of crushing bosses formed on an outer periphery to primarily crush the decomposed residue. The rollers 13 are meshed with each other, and are rotated to crush the decomposed residue passing through the rollers.

The crushed residue is discharged from the discharge port.

The decomposed residue processing means has, as shown in FIG. 3, a crusher 2 positioned under the discharge port, a chain conveyor 3 for separating the decomposed residue crushed by the crusher 2 into carbon and an iron core, and a carbon storage 4 and an iron core storage 5 each for storing carbon and the iron core separated by the chain conveyor 3.

The crusher 2 secondarily crushes the crushed residue discharged from the discharge port to separate the residue into the carbon and the iron core. The crusher 2 is positioned under the discharge port, and has a pair of rollers as the rollers 13 provided in the pyrolysis reactor 1. Hence, the crusher 2 secondarily crushes the decomposed residue passing through the rollers.

Preferably, the crusher 2 crushes the residue in such a way that it has a size smaller than that of the residue crushed by the rollers 13 in the pyrolysis reactor 1.

The decomposed residue crushed as described above falls down onto the left and lower parts of the chain conveyor 3. While the residue is pushed and moved in a right direction by a vertical rod attached to the chain conveyor 3, a carbon component falls down through holes (meshes) formed on the steel plate placed under the chain conveyor 3 to collect the carbon. The collected carbon component is transferred and stored in the carbon storage 4 by the air.

The iron core does not pass through the holes formed on the steel plate, and is moved to the right end of the steel plate, so that the iron core falls down into the iron core storage 5.

The oil collecting means is to recover oil from the hot steam produced by the pyrolysis reactor 1, and has a condenser 6, an oil tank 7, a cyclone 8, and a third recovery tank 9, as shown in FIG. 4.

The condenser 6 is to cool and condense the hot vapor discharged from the discharge port of the pyrolysis reactor 1, and the hot vapor inputted into the condenser 6 is cooled and condensed for the most part to primarily recover heavy oil from the vapor. The recovered heavy oil is collected by the oil tank 7.

The heavy oil component, which is cooled and condensed by the condenser 6 but is not collected, is dispersed into the carrier gas ($CO_2$ or $N_2$) in a mist state, and thus flows together with the carrier gas such as a gas. The heavy oil component is transferred into the cyclone 8 by the carrier gas. The heavy oil component is secondarily collected by a powerful whirlpool generated by the cyclone 8, and the collected heavy oil is transferred to the oil tank 7.

The heavy oil component which is not collected by cyclone 8 is transferred to the third recovery tank 9. In this instance, the third recovery tank 9 directly contacts the carrier gas with liquefied oil in an aerated manner to collect the unrecovered heavy oil. The heavy oil collected as described above is transferred to the oil tank 7.

The oil is collected through three collecting processes, and is then stored in the oil tank 7.

The carbon processing means is to generate the electricity by using the carbon collected by the decomposed residue processing means, and has a carbon incinerator 10 for burning up the carbon supplied by the carbon storage 4 to produce a hot exhaust gas, a primary heat exchanger 11, a secondary heat exchanger 12, a steam turbine 13, an absorption refrigerator 14, and a high-pressure pump 15.

The carbon incinerator 10 is to burn up the carbon transferred from the carbon storage 4 by the heat generated from the carbon itself, in which if the carbon is initially heated, the carbon is burned up by itself-heat.

The primary heat exchanger 11 receives the hot exhaust gas produced by the carbon incinerator 10, and heats the cold carrier gas, so as to supply the hot carrier gas to the pyrolysis reactor 1.

The secondary heat exchanger 12 converts the exhaust gas passing through the primary heat exchanger 11 into a pressurized steam of about 15 $Kg/cm^2$. The pressurized steam is supplied to the steam turbine 13 to operate the steam turbine 13 and thus generate the electricity.

The depressurized steam (about 5 $Kg/cm^2$) used to operate the turbine in the steam turbine 13 and discharged therefrom is fed to the absorption refrigerator 14 to produce the cold water. After that, the condensed water is pumped by the high-pressure pump 15, and is then circulated in the secondary heat exchanger 12.

At that time, the cold water obtained from the absorption refrigerator 14 is fed to the condenser 6, and after it is used in the cooling and condensing process conducted by the condenser 6, the water is fed back to the absorption refrigerator 14.

The exhaust gas processing means is to clarify the exhaust gas discharged from the secondary heat exchanger 12 and then discharge the clarified gas in the atmosphere. The exhaust gas processing means has a purifying tower 16 and a carrier gas separating unit 17, as shown in FIG. 6.

The purifying tower 16 receives the exhaust gas discharged from the secondary heat exchanger 12, and contacts the exhaust gas with a diluted caustic soda solution contained in the purifying tower 16 to eliminate SOx from the exhaust gas and thus purify the exhaust gas.

At that time, the purifying tower 16 is supplied with the cold water produced by the absorption refrigerator 14, and the cold water is used in heat exchange conducted by the purifier tower 16.

The gas purified by and discharged from the purifying tower 16 consists of about 79% of nitrogen, about 16% of carbon dioxide, and about 5% of oxygen. Accordingly, only gas which is not harmful to human body is discharged in the atmosphere.

The exhaust gas discharged from the purifying tower 16 is inputted into the carrier gas separating unit 17 (e.g., pressure swing adsorption; PSA) so as to separate the $CO_2$ or $N_2$ gas from the exhaust gas. The separated $CO_2$ or $N_2$ gas is again used as the carrier gas.

The carrier gas separated by the carrier gas separating unit 17 is fed to the front end of the blower 18 to fill up the carrier gas, and the same amount of the carrier gas is discharged to the rear end of the blower to prevent accumulation of unknown materials.

According to the present invention, the waste tires are thermally decomposed by the pyrolyzing means to produce the decomposed residue and the exhaust gas. The decomposed residue is recycled as useful resources such as carbon and iron core by the decomposed residue processing means, and the oil is recycled by using the exhaust gas. The recycled carbon is incinerated to generate heat energy required for decomposing waste tire and generate the electricity and the cold water through the steam turbine and the absorption refrigerator. The carrier gas is separated from the exhaust gas by the exhaust gas processing means.

As described above, the waste-tire recycling system of the present invention can generate oil, carbon, scrap iron, $CO_2$ or $N_2$, electricity, and cold water by recycling the waste tires, thereby improving a recycling efficiency and preventing the environmental pollution.

Also, the waste tires are thermally decomposed through the direct heating type of pyrolysis reactor using the $CO_2$ or $N_2$ gas as the carrier gas, thereby preventing the pyrolysis reactor from exploding.

The recycling system of the present invention can generate the oil of high quality which contains no moisture, thereby obtaining a higher economical effect from the oil.

Further, the energy generated when the recycled carbon is burned is converted into the electricity to heat energy required for decomposing waste tire and the cold water which are required to operate the system.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

INDUSTRIAL APPLICABILITY

As apparent from the above description, the waste-tire recycling system of the present invention can generate oil, carbon, scrap iron, $CO_2$ or $N_2$, electricity, and cold water by recycling the waste tires, thereby improving a recycling efficiency and preventing the environmental pollution.

Also, the waste tires are thermally decomposed through the direct heating type of pyrolysis reactor using the $CO_2$ or $N_2$ gas as the carrier gas, thereby preventing the pyrolysis reactor from exploding.

The recycling system of the present invention can generate the oil of high quality which contains no moisture, thereby obtaining a higher economical effect from the oil.

Further, the energy generated when the recycled carbon is burned is converted into the heat energy, the electricity and the cold water which are required to operate the system.

The invention claimed is:

1. A waste-tire recycling system comprising:
a pyrolysis means configured to directly heat and pyrolyze waste tires to provide a thermally decomposed residue in a pyrolysis reactor using $CO_2$ or $N_2$ gas as a carrier gas;
a decomposed residue processing means configured to crush said thermally decomposed residue obtained from the pyrolysis reactor and separate the crushed residue into carbon and iron core;
an oil collecting means for cooling and condensing an exhaust gas discharged from the pyrolysis reactor to recover heavy oil;
a carbon processing means, said carbon processing means including a carbon incinerator for burning the carbon obtained from the decomposed residue processing means to produce a hot exhaust gas, a heat exchanger for heating said carrier gas to supply hot carrier gas to the pyrolysis reactor for said pyrolysis of said waste tires, a steam turbine operating using a pressurized steam heated and pressurized by said hot exhaust gas to generate electricity, and an absorption refrigerator to cool said steam discharged from the steam turbine and convert into water; and
an exhaust gas processing means for purifying the exhaust gas utilized and discharged from the carbon processing means to discharge into the atmosphere as a purified gas, and said exhaust gas processing means having a carrier gas separating device to separate and recover said carrier gas of $CO_2$ or $N_2$ from said exhaust gas.

2. The waste-tire recycling system as claim 1, wherein the pyrolysis reactor used in the pyrolyzing means includes an inlet port formed on a portion of an upper portion thereof for inputting the waste tires, a discharge port formed on a portion of the upper portion for circulating hot vapor produced by pyrolysis, an outlet port formed on a lower portion thereof for discharging the decomposed residue, and a pair of rollers provided on a bottom thereof and meshed with each other and rotated to crush the decomposed residue.

3. The waste-tire recycling system as claimed in claim 1, wherein the decomposed residue processing means includes a crusher (2) for subsequently crushing the residue primarily crushed by the pyrolysis reactor (1); a chain conveyor (3) for separating the residue crushed by the crusher (2) into said carbon and said iron core; and a carbon storage (4) and an iron core storage (5) respectively for storing the carbon and the iron core separated by the chain conveyor (3).

4. The waste-tire recycling system as claimed in claim 1, wherein the oil collecting means includes a condenser (6) for cooling and condensing the hot exhaust gas discharged from the pyrolysis reactor (1) to recover heavy oil from the exhaust gas; a cyclone (8) connected to the condenser (6) for collecting a heavy oil, which is dispersed in the carrier gas in a mist state; and a third recovery tank (9) for directly contacting the heavy oil with liquefied heavy oil in an aerated manner to collect heavy oil not collected by the cyclone (8); and an oil tank (7) for storing the heavy oil collected by the condenser (6), the cyclone (8), and the third recovery tank (9).

5. The waste-tire recycling system as claimed in claim 1, wherein the carbon processing means includes carbon incinerator (10) for burning the carbon supplied by carbon storage (4) using heat generated from the carbon itself; a primary heat exchanger (11) for heating the carrier gas, which is cooled when it passes through the oil collecting means from the pyrolysis reactor, by using the hot exhaust gas produced by the carbon incinerator (10); a secondary heat exchanger (12) for converting the exhaust gas passing through the primary heat exchanger (11) into the pressurized steam; steam turbine (12) and absorption refrigerator (14) to respectively generate said electricity and condensed water; and a high-pressure pump (15) for circulating the condensed water discharged from the absorption refrigerator (14) into the secondary heat exchanger (12).

6. The waste-tire recycling system as claimed in claim 1, wherein the exhaust gas processing means includes a purifying tower (16) for eliminating SOx from the exhaust gas discharged from the secondary heat exchanger (12) by using a diluted caustic soda solution to discharge the purified exhaust gas in the atmosphere; and a carrier gas separating unit (17) receiving a part of the exhaust gas discharged from the purifying tower (16) to separate and recover the carrier gas of $CO_2$ or $N_2$ from the exhaust gas for reusing as the carrier gas.

* * * * *